March 6, 1951 A. C. BROOKEY 2,543,886
NUTCRACKER
Filed April 21, 1948 2 Sheets-Sheet 1
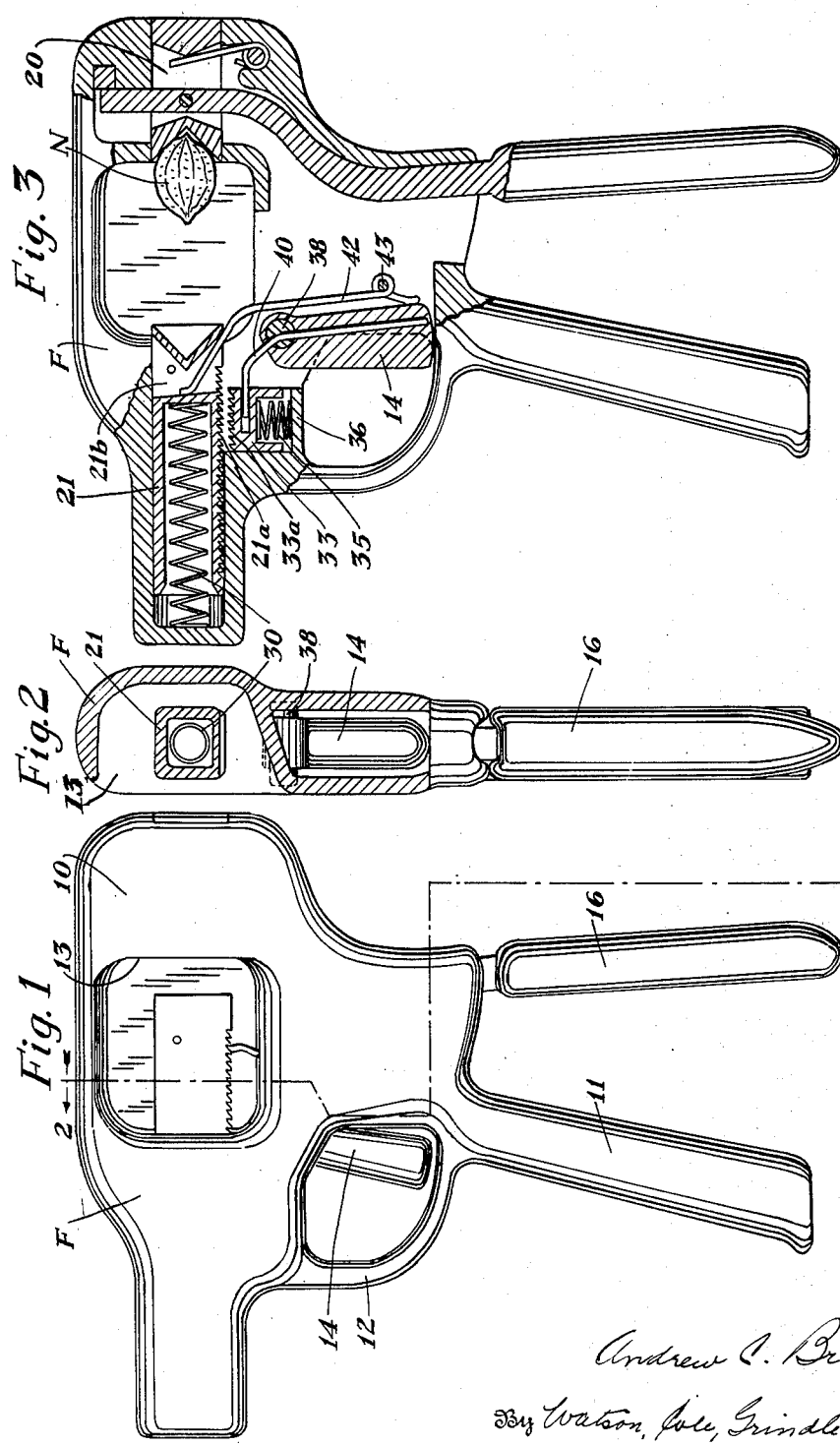
Inventor
Andrew C. Brookey
By Watson, Cole, Grindle & Watson
Attorneys.

March 6, 1951  A. C. BROOKEY  2,543,886
NUTCRACKER
Filed April 21, 1948  2 Sheets-Sheet 2
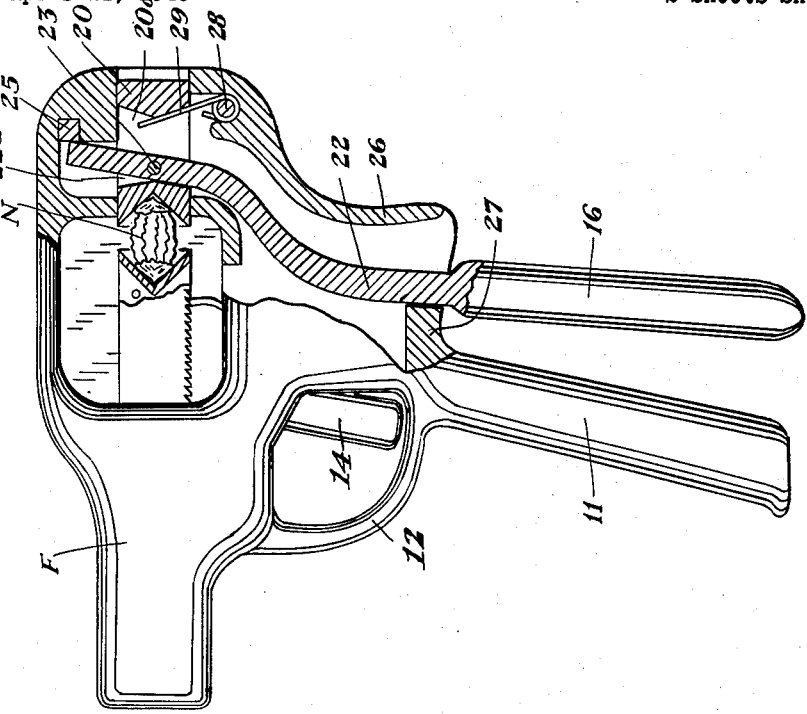
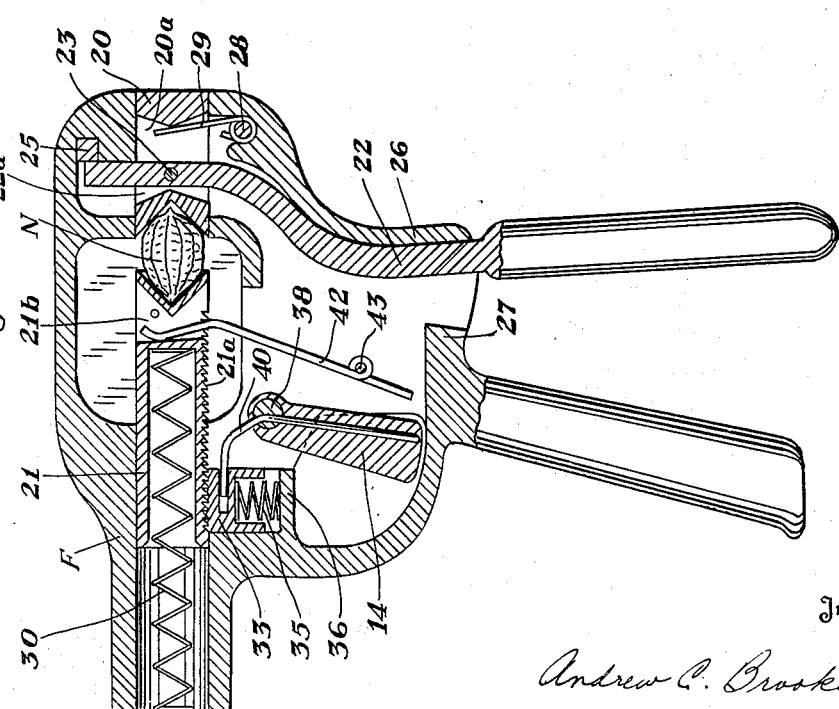
Inventor
Andrew C. Brookey
By Watson, Cole, Grindle & Watson,
Attorney.

Patented Mar. 6, 1951

2,543,886

UNITED STATES PATENT OFFICE 2,543,886

NUTCRACKER

Andrew C. Brookey, San Antonio, Tex.

Application April 21, 1948, Serial No. 22,298

3 Claims. (Cl. 146—16)

This invention relates to devices for cracking nuts, particularly nuts of small size and having relatively thin shells, such for instance as pecans.

It has heretofore been proposed that hand manipulated mechanical means might with advantage be employed for cracking the outer shells of nuts without damaging the enclosed meats or kernels but, for one reason or another, those devices of this nature which have heretofore been provided have not met with popular approval, the hand operated nutcracker commonly used having no means for safeguarding the meat and protecting it against injury due to excessive movement of the shell cracking jaws or members.

The present invention provides a simple, light weight cracking device, attractive in appearance, durable in use and inexpensive to manufacture, by means of which nuts may be cracked singly and in rapid succession without fatiguing the operator, the shell of each nut being subjected to such pressure that it is largely shattered and separated from the kernel or meat, without, however, distorting, breaking or injuring the meat in any way. The device is so designed that it may be grasped and manipulated entirely by one hand of the operator who therefore has his other hand entirely free and may use it to place fresh nuts to be cracked successively in the device. The arrangement is such that the relatively movable cracking jaws move quickly into nut-engaging position, and lightly engage an interposed nut, as a result of the application of the forefinger lightly against a trigger-like member, whereas the crushing force is produced by a contraction of the hand, at least three fingers extending around and engaging one of two relatively movable members and the palm of the hand engaging the second member, muscular contraction of the hand drawing these two portions together and, by reason of the nature of the mechanical connection between at least one of these members and the cracking jaws, applying the cracking force with a minimum of hand applied force.

The invention may be embodied in cracking mechanisms which vary widely in appearance and in the design and arrangement of its component elements. A preferred form is illustrated in the accompanying drawings and will be described in detail, this form being set forth by way of example.

In the drawings:

Figure 1 is a side elevation of the nutcracking device in its entirety;

Figure 2 is a section on line 2—2 of Figure 1;

Figure 3 is a view similar to Figure 1, a portion of the shell or housing of the device having been broken away, however, to render visible certain of its working parts;

Figure 4 is a similar view but showing the working parts of the mechanism in positions which are different from those in which these parts are shown in Figure 3; and Figure 5 is also similar to Figure 3, the parts being shown in the positions which they occupy at the conclusion of a nutcracking operation.

The nutcracker is preferably fabricated of light metal insofar as this is possible or practical, for instance aluminum, and the frame F may conveniently comprise an aluminum casting having a body portion 10 and an integral finger piece 11 which comprises one portion of the two part handle or grip which is grasped by the operator, the frame likewise including a curved guard portion 12. A recess 13, or shallow pocket, receives a nut to be cracked and into this recess the cracking jaws may be projected. The nutcracker will ordinarily be held in the right hand and loaded and unloaded with the left, the pocket 13 opening to the left when the device is normally grasped. During cracking the left hand may be held over the mouth of pocket 13 so that shell fragments are retained in the pocket.

The guard 12 is positioned to protect a movable trigger member 14 adapted to be actuated by the forefinger of the operator. Immediately in rear of, and extending generally parallel to the finger piece 11, is a palm piece 16 which is mounted upon the end of a lever which comprises one of the operating elements of the mechanism and which will be hereinafter more particularly described. The nutcracker, therefore, including frame F, having finger piece 11, together with the trigger 14 and palm piece 16, has somewhat the appearance of a revolver or pistol and has been so designed that the operator will grasp it in largely the same manner that a pistol is grasped, a hand position familiar to all.

The cracking jaws comprise two aligned metallic members 20 and 21 each generally rectangular in transverse section and slidably mounted in a slideway formed in the frame. The mutually facing adjacent ends of the cracking jaws are concave so that, when these jaws are caused to approach each other and to engage, respectively, the opposite ends of a nut N, the nut ends will be received within cup like recesses formed in the ends of the jaws and the nut will be supported in the position in which it is shown in Figure 4. Jaw 20 is adapted to be reciprocated by means of a lever 22 disposed within a slot formed in the frame F for its reception, and the side walls of which guide the lever in its movements, lever 22 passing through a slot 22a formed in the jaw and being pivotally connected to the jaw as by a pin 23 extending transversely across the slot 20a. At its upper end lever 22 bears against a steel insert 25 which serves as a fulcrum about which the lever may move, the lever being shown in its rear or retracted position in Figure 4 and in its forward position in Figure 5, its rearward movement being limited by contact with the rear wall 26 of the slot within which the lever moves and its forward movement by contact with a stop 27 which comprises an integral portion of the frame. A coiled spring 28 housed in a recess in the frame has an upstanding end 29 which enters the recess 20a of the jaw 20 and normally tends to maintain the jaw in the position in which it is shown in Figure 4, with the lever 22 in the rear or retracted position in which it is shown in that figure.

The second or opposed movable jaw 21 is considerably longer than jaw 20 and is hollowed out to receive a helical compression spring 30, one end of this spring bearing against the frame F at the outer end of the slideway within which the jaw 21 is supported for reciprocation and the other end bearing against the end surface of the spring recess formed in the jaw. Jaw 21 is provided on its undersurface with a series of teeth or serrations 21a one face of each tooth being disposed in a plane transverse to the rectilinear path of movement of the jaw and the other face disposed in a plane which is forwardly and upwardly inclined, as seen in Figure 4. Mounted in a slideway disposed below and at right angles to the slideway in which the jaw 21 is received is a locking dog 33 the upper end of which is provided with a series of teeth 33a adapted to enter the interdental spaces of the toothed undersurface of the jaw 21, and to closely engage those teeth. A helical spring 35, the upper end of which bears against the undersurface of locking dog 33 and the lower end of which bears against a spring seat 36 which comprises portion of the frame F, normally maintains the locking dog in engagement with the jaw 21. Dog 33 may be withdrawn from contact with jaw 21 by manipulating the trigger 14 previously referred to, this trigger being pivotally mounted at 38 upon the frame F and being connected to the locking dog 33 by an extension 40 the upper end of which enters a recess in the locking dog. Immediately in rear of the trigger 14 is a lever 42 pivotally mounted upon the frame by means of a transverse pin 43 which bridges the slot in which the trigger and lever 42 are received, this slot being a continuation of that within which lever 22 is housed. The lower end of lever 42 lies in the path of movement of the trigger 14 and its upper end projects into a slot or recess 21b formed in the sliding jaw 21.

The nutcracker described may be utilized in the cracking of the shells of various nuts but, as previously explained, is particularly helpful in removing the outer shells of pecans without injury to the meats. When the device is not in use its several movable members will occupy the positions in which they are illustrated in Figure 1. Prior to the insertion of a nut such as N between the cracking jaws the jaw 21 will be moved into the position in which it is shown in Figure 3, being retracted against the action of spring 30 by force applied to the trigger 14 and which is transmitted to the sliding jaw through lever 42. The locking dog 33a will, of course, be lowered to inoperative position prior to the time of contact of the trigger with the jaw actuating lever 42. After a nut has been positioned (Fig. 3) the operator will relieve the pressure of his finger against the trigger and, as the trigger moves forwardly the jaw will advance toward the nut N and engage the end of the nut so that the nut is lightly held between jaws 20 and 21 the spring 30 alone being active to apply force to the shell.

After jaw 21 has come to rest against nut N and lever 42 has ceased to move the trigger 14 continues to advance and the locking dog to rise owing to the continuing action of spring 35, this movement continuing until the locking dog is in full locking engagement with jaw 21 and the trigger in its extreme forward position. Jaw 21 is thus locked in the position in which it is shown in Figure 3. Pressure to crack the shell of nut N is then applied by closure of the operator's hand, finger piece 11 and palm piece 16 being caused to approach each other and the jaw 20 being caused to advance toward jaw 21. Forward movement of jaw 20 ceases when lever 22 makes contact with stop 27 and hence the possible forward motion of the jaw 20 on its working stroke is positively controlled. The side wall of the nut is laterally expanded as the nut is axially shortened and, just prior to contact of lever 22 with stop 27, the shell will be shattered and fall or fly from the nutcracker, except for the small cup shaped end portions (Fig. 5). When the cracking pressure is relieved spring 29 will retract jaw 20 and the nut meats and fragments of shell may be caused to fall from the pocket 13, by tilting the nutcracker if necessary, and any fragments of shell adhering to the meat quickly detached. If desired the stop 27 may be made adjustable, so that the extent of forward travel of jaw 20 may be regulated. After removal of the nut the shell of which has been cracked as described, the trigger may be manipulated to retract jaw 21 and a fresh nut placed in the nutcracker.

By means of the device described a large number of nuts may be cracked in rapid succession without fatigue to the operator and without injuring the nut meats. It will be appreciated that the design and arrangement of the component elements of the device may be changed in various ways without departure from the invention. This application is a continuation in part of my prior application Serial Number 696,674, filed September 13, 1946 now abandoned.

Having thus described the invention, what is claimed as new and desired to be secured by Letters Patent is:

1. In a nutcracker, in combination, a frame, opposed nut engaging jaws mounted on said frame for relative movement toward and away from each other, means for causing said jaws to apply cracking pressure to an interposed nut which they mutually engage, and mechanism for advancing and retracting one of said jaws said mechanism comprising, a spring for advancing the said jaw to nut engaging position, a member for locking the jaw against movement under the pressure applied through a nut during a nut cracking operation, a lever pivotally mounted on said frame and engaging said jaw, and a trigger pivotally mounted on said frame and connected to said locking member, the arrangement being such that initial movement of said trigger withdraws said member from said jaw, and further movement of said trigger causes it to contact with and actuate said lever and thereby cause retraction of the jaw against the action of the spring.

2. In a nutcracker, in combination, a frame having a finger piece, a lever mounted on the frame and having a palm piece, spring means normally resisting relative movement of the lever toward the finger piece and a stop on said frame positively limiting such movement, opposed nut engaging jaws mounted on said frame for relative movement toward and away from each other one of which jaws is associated and movable with said lever, and mechanism for advancing and retracting the other of said jaws, said mechanism comprising, a spring for advancing the other said jaw to nut engaging position, a member for locking the said other jaw against movement under the pressure applied through a nut during a nutcracking operation, a second member for retracting the said other jaw against the action of said spring and manually operable means for actuating said members.

3. In a nutcracker, in combination, a frame having a finger piece, a first lever mounted on the frame and having a palm piece, spring means normally resisting the relative movement of the first lever toward the finger piece and a stop on said frame positively limiting such movement, opposed nut engaging jaws mounted on said frame for relative movement toward and away from one another, one of said jaws being associated and movable with said first lever, and mechanism for advancing and retracting the other of said jaws said mechanism comprising, a spring for advancing the said other jaw to nut engaging position, a member for locking the said other jaw against movement under the pressure applied through a nut during a cracking operation, a spring normally holding said member in jaw engaging position, and a second lever pivotedly mounted on said frame and connected to said member, for withdrawing said member from jaw engaging position.

ANDREW C. BROOKEY.

REFERENCES CITED

The following references are of record in the file of this patent:

UNITED STATES PATENTS

| Number | Name | Date |
|---|---|---|
| 1,192,846 | Boyer | Aug. 1, 1916 |
| 1,254,119 | Chamberlain et al. | Jan. 22, 1918 |
| 1,322,393 | Bagby | Nov. 18, 1919 |
| 1,351,983 | Allen | Sept. 7, 1920 |
| 1,412,443 | Atwood | Apr. 11, 1922 |
| 2,157,501 | Settle | May 9, 1939 |
| 2,224,415 | Tonn | Dec. 10, 1940 |
| 2,346,980 | Lotspeich | Apr. 18, 1944 |
| 2,407,350 | Spooner | Sept. 10, 1946 |

FOREIGN PATENTS

| Number | Country | Date |
|---|---|---|
| 186,180 | Germany | Aug. 3, 1906 |